United States Patent
Kato et al.

(10) Patent No.: US 7,885,038 B2
(45) Date of Patent: Feb. 8, 2011

(54) MAGNETIC HEAD SLIDER

(75) Inventors: Atsushi Kato, Kanagawa (JP); Kiyonori Shiraki, Kanagawa (JP); Kouji Yamaguchi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1022 days.

(21) Appl. No.: 11/710,316

(22) Filed: Feb. 22, 2007

(65) Prior Publication Data

US 2007/0201165 A1    Aug. 30, 2007

(30) Foreign Application Priority Data

Feb. 28, 2006    (JP) .............................. 2006-051792

(51) Int. Cl.
*G11B 5/60*    (2006.01)
(52) U.S. Cl. .................................................. 360/234.5
(58) Field of Classification Search .............. 360/234.5, 360/245.3, 245.9, 245.8, 245, 234.6, 234.7, 360/234, 246.6, 245.2
See application file for complete search history.

(56) References Cited

U.S. PATENT DOCUMENTS

| | | | |
|---|---|---|---|
| 7,068,468 B2 | 6/2006 | Kamijima | |
| 7,525,765 B2 * | 4/2009 | Kurita et al. | 360/235.4 |
| 7,729,088 B2 * | 6/2010 | Kurita et al. | 360/234.4 |
| 7,733,606 B2 * | 6/2010 | Kato et al. | 360/234.3 |
| 2004/0184192 A1 | 9/2004 | Ota et al. | |
| 2004/0201920 A1 | 10/2004 | Koide et al. | |
| 2005/0237667 A1 * | 10/2005 | Chhabra et al. | 360/234.5 |
| 2006/0034014 A1 * | 2/2006 | Kato et al. | 360/128 |
| 2006/0056110 A1 * | 3/2006 | Kato et al. | 360/234.3 |
| 2006/0119971 A1 * | 6/2006 | Kurita et al. | 360/69 |
| 2008/0037182 A1 * | 2/2008 | Albrecht et al. | 360/323 |

FOREIGN PATENT DOCUMENTS

| | | |
|---|---|---|
| JP | 05-020635 | 1/1993 |
| JP | 2004-335069 | 11/2004 |

\* cited by examiner

*Primary Examiner*—Allen T Cao
(74) *Attorney, Agent, or Firm*—Patterson & Sheridan, LLP

(57) ABSTRACT

Embodiments in accordance with the present invention provide a magnetic head slider which includes a magnetic recording/reproducing element and a heater which are formed in an air outflow end surface of a slider. The heater includes a heating portion, terminal portions extending from both ends of the heating portion, and lead portions overlapping the respective terminal portions at an overlap ratio of approximately 50% or more.

13 Claims, 8 Drawing Sheets

RATIO OF OVERLAPPING LEAD PORTION TO AREA OF TERMINAL PORTION (%)

DIMENSION OF NARROWEST OF PART OF TERMINAL
THAT DOES NOT OVERLAP LEAD PORTION (nm)

MAGNETIC HEAD SLIDER

CROSS-REFERENCE TO RELATED APPLICATION

The instant nonprovisional patent application claims priority to Japanese Patent Application 2006-051792, filed Feb. 28, 2006 and incorporated by reference in its entirety herein for all purposes.

BACKGROUND OF THE INVENTION

A magnetic disk unit includes a magnetic disk that rotates and a slider in which a magnetic recording/reproducing element included in a magnetic head is incorporated and which is borne by a suspension. The slider relatively travels over a magnetic disk, and the magnetic recording/reproducing element writes or reads magnetic information in or from the magnetic disk. The slider floats as an air lubrication bearing due to the wedge film effect of air, whereby the magnetic disk and slider do not come into solid contact with each other. In order to realize a magnetic disk unit featuring a high recording density and a large capacity stemming from the high recording density or a compact design, it would prove effective to reduce the distance between the magnetic recording/reproducing element and magnetic disk, that is, reduce a magnitude of floating of the slider, and increase a line recording density.

In the past, when a magnitude of floating of a slider is designed, a decrease in a magnitude of floating stemming from a difference caused by machining, a difference in an atmospheric pressure in a use environment, or a difference in temperature in the use environment has been estimated, and a margin of error in the magnitude of floating has been designated for fear that a slider and a disk may come into contact under the worst condition. If a slider having the ability to adjust a magnitude of floating for an individual head or according to a use environment is realized, the margin of error could be abolished. Consequently, while the contact between the slider and disk is prevented, the distance between a magnetic recording/reproducing element and the magnetic disk can be greatly decreased.

JP-A No. 20635/1993 (Patent Document 1) describes a technology for minimizing the gap between the distal ends of magnetic poles and the surface of a magnetic disk according to which: a thin-film resistor is interposed between a lower magnetic pole of an inductive thin-film magnetic head and an upper magnetic pole thereof, and heated if necessary by conducting electricity in order to project the distal ends of the magnetic poles through thermal expansion. JP-A No. 335069/2004 (Patent Document 2) describes a technology for making an amount of heat dissipated from a heating portion of a heater larger than an amount of heat dissipated from lead portions thereof by making a sheet resistance offered by the heading portion larger than a sheet resistance offered by the lead portions.

A heating portion and lead portions of a heater incorporated in a thin-film magnetic head are produced in the course of a thin-film formation process. In general, the heating portion is formed, and the lead portions are then formed so that one ends of the lead portions will overlap a conductor of the heating section. At this time, a contact resistance or any other resistance may be varied depending on a way of overlapping patterns. If the contact resistance increases at the overlaps between the conductor of the heating portion and the lead portions, a resistance offered by the lead portions increases. This causes a heat loss occurring at the lead portions to increase. Consequently, the heating portion fails to dissipate a predetermined amount of heat. This signifies that an expected effect of minimizing a magnitude of floating is not exerted. The foregoing existing technology does not take account of a change in the contact resistance attributable to the overlapping of patterns.

BRIEF SUMMARY OF THE INVENTION

In a conventional magnetic head slider having an incorporated heater for controlling a magnitude of floating, since terminal portions of the heater are produced at a step different from a step of producing lead portions thereof, a resistance offered by the lead portions increases due to a contact resistance occurring at the overlaps between the terminal portions and lead portions. This increases a heat loss. Consequently, a conventional heating portion fails to dissipate a predetermined amount of heat. This makes it difficult to achieve expected minimization of a magnitude of floating and can lead to a failure in filling the role of a thin-film magnetic head.

Accordingly, embodiments of the present invention provide a magnetic head slider which includes a magnetic recording/reproducing element and a heater which are formed in an air outflow end surface of a slider. The heater includes a heating portion, terminal portions extending from both ends of the heating portion, and lead portions overlapping the respective terminal portions at an overlap ratio of approximately 50% or more.

For a more complete understanding of the present invention, reference is made to the following detailed description taken in conjunction with the accompanying drawings.

DETAILED DESCRIPTION OF THE INVENTION

Embodiments in accordance with the present invention relate to a slider structure for realizing a high recording density in a magnetic disk unit. More particularly, embodiments of the present invention are concerned with a magnitude-of-floating adjusting slider having the ability to adjust the distance between a magnetic disk and a magnetic head.

An object of an embodiment of the present invention is to diminish a change in a resistance offered by lead portions of a heater intended to adjust a magnitude of floating of a slider.

In order to accomplish the above object, a magnetic head slider in accordance with an embodiment of the present invention includes a magnetic head and a heater which are formed in an air outflow end surface of the slider. The heater includes a heating portion, terminal portions that extend from both ends of the heating portion, and lead portions that overlap the respective terminal portions at an overlap ratio of approximately 50% or more.

The lead portions of the heater overlie or underlie the terminal portions. In one embodiment, a dimension from an edge of an underlying member in a lateral direction thereof to an edge of an overlying member is larger than the thicknesses of the terminal portions and lead portions.

The magnetic head includes a reproduction element and electrodes connected to both ends of the reproduction element. The heater underlies or overlies the magnetic head. The lead portions of the heater are tapered towards the heating section. In one embodiment of the present invention, the width in a lateral direction of the widest part of each of the lead portions that overlaps each of the electrodes of the magnetic head is approximately twenty times or less larger than the width of the narrowest part in the lateral direction thereof.

According to an embodiment of the present invention, a change in a resistance offered by lead portions of a heater incorporated in a magnetic head slider having the ability to adjust a magnitude of floating can be suppressed.

A magnetic head slider in accordance with an embodiment of the present invention and a magnetic disk unit employing the magnetic head slider will be described below in conjunction with drawings.

Figure 2:
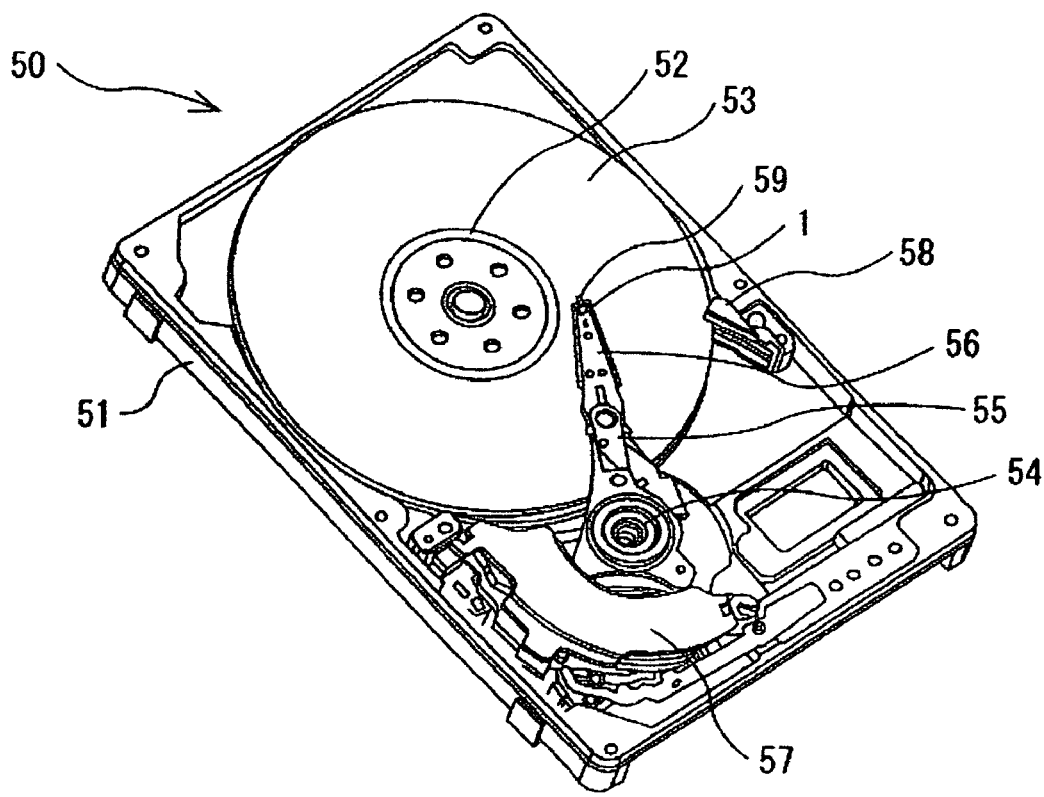
FIG. 2 is a top view of a magnetic disk unit including the magnetic head slider in accordance with an embodiment of the present invention.

FIG. 2 shows the configuration of a magnetic disk unit 50. A magnetic disk 53 is engaged with a rotation shaft 52 of a spindle motor fixed to a base 51, and driven to rotate. An actuator arm 55 is supported by a pivot 54. A suspension 56 is attached to one end of the actuator arm 55, and a coil (not shown) included in a voice coil motor (VCM) 57 is attached to the other end of the actuator arm 55. A magnetic head slider 1 is mounted in the distal end of the suspension 56. A ramp mechanism 58 is disposed on the base 51 and located on the side of the periphery of the magnetic disk 53. The ramp mechanism 58 has a slope on which a lift tab 59 rides when the magnetic head slider 1 is unloaded.

When electricity is conducted to the coil included in the VCM 57, a torque occurs in the actuator arm 55. The suspension 56 attached to the actuator arm 55 is moved in a direction of the radius of the magnetic disk 53. The rotation causes the magnetic head slider 1, which is mounted in the distal end of the suspension 56, to be aligned with an arbitrary track located at a position in the direction of the radius of the magnetic disk 53. The magnetic head slider 1 then records or reproduces data. When the magnetic head slider 1 is unloaded, the lift tab 59 is moved to ride on the slope of the ramp mechanism 58. For loading, the magnetic head slider 1 that stands by in the ramp mechanism 58 is loaded on the recording surface of the magnetic disk 53.

The magnetic head slider 1 floats as an air lubrication bearing due to the wedge film effect of air but does not directly come into solid contact with the magnetic disk 53. A magnitude of floating of the magnetic head slider 1 is of the order of approximately 10 nm or less. Herein, the magnetic disk unit is described to include the loading/unloading mechanism. Alternatively, the magnetic disk unit may be of a contact start/stop type so that when the magnetic disk unit is stopped, the magnetic head slider 1 stands by above a specific area on the magnetic disk 53. Moreover, either surface recording or vertical recording may be adopted as a magnetic recording method.

Figure 3:
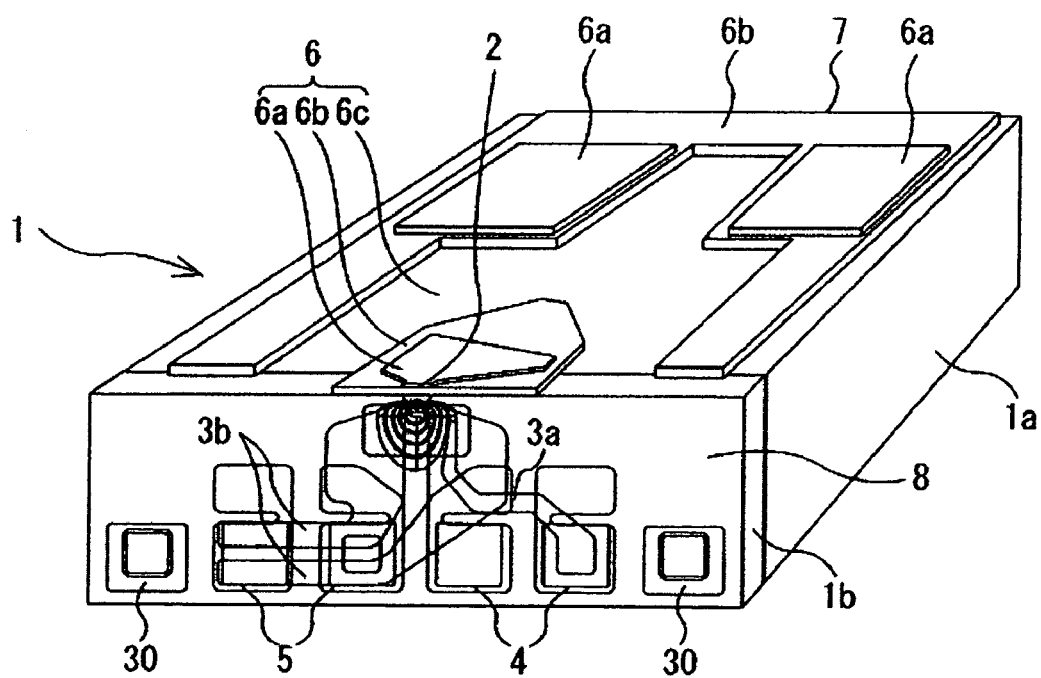
FIG. 3 is a perspective view of the magnetic head slider in accordance with an embodiment of the present invention.

FIG. 3 is an enlarged view of the magnetic head slider 1. The magnetic head slider 1 includes a substrate portion (slider) 1a made of a ceramic material represented by a sintered alloy of alumina and titanium carbide, and a thin-film magnetic head portion 1b. The slider 1a is shaped nearly like a rectangular parallelepiped having a length of approximately 1.25 mm, a width of approximately 1.0 mm, and a thickness of approximately 0.3 mm, and has a total of six surfaces, that is, a floating surface 6, an air inflow end surface 7, an air outflow end surface 8, flanks, and a back (the slider is called a Pico-slider). For improvement of precision in alignment or a reduction in a cost that is achieved by reducing a mass, the dimensions of the slider may be set to a length of approximately 0.85 mm, a width of approximately 0.7 mm, and a thickness of approximately 0.23 mm (the slider is called a Femto-slider). The floating surface 6 has microscopic steps formed through ion milling, etching, or any other machining process so as to serve as a step bearing. The floating surface 6 generates an air pressure when opposed to the magnetic disk, and fills the role of an air bearing that bears a load imposed on the back.

Three kinds of steps that are substantially parallel to one another are formed on the floating surface 6. Namely, the three kinds of steps are rail surfaces 6a that approach most closely a disk, shallow groove surfaces 6b that are step bearing surfaces and lie deeper by a dimension, which ranges from approximately 100 nm to approximately 200 nm, than the rail surfaces 6a, and a deep groove surface 6c lying deeper by approximately 1 μm than the rail surfaces 6a. When airflow stemming from the rotation of a disk moves from the shallow groove surface 6b, which is a step bearing surface and located on the side of the air inflow end surface 7, to the rail surfaces 6a, the airflow is compressed because of a narrow channel. This brings about a positive air pressure. On the other hand, when airflow moves from the rail surfaces 6a and shallow groove surfaces 6b to the deep groove surface 6c, since a channel expands, a negative air pressure occurs. Noted is that FIG. 3 exaggeratedly shows the depths of the grooves.

The magnetic head slider 1 is designed to float in a posture permitting a magnitude of floating to get larger on the side of the air inflow end surface 7 than on the side of the air outflow end surface 8. Consequently, part of the floating surface close to the outflow end of the magnetic head slider approaches a disk most closely. Near the outflow end, the rail surface 6a projects relative to the surrounding shallow groove surfaces 6b and deep groove surface 6c. As long as the slopes of the pitching posture and rolling posture of the slider do not exceed a certain limit, the rail surface 6a approaches the disk most closely. A magnetic recording/reproducing element 2 included in a magnetic head is formed in a portion of the rail surface 6a belonging to the thin-film head portion 1b. The shape of the floating surface 6 is designed so that a load imposed by the suspension and positive and negative air pressures caused by the floating surface 6 will be well-balanced and the distance from the magnetic recording/reproducing element 2 to the disk will be held at an appropriate value of about 10 nm. Herein, a description has been made of the slider whose floating surface 6 is a two-stage step bearing floating surface including three kinds of surfaces 6a, 6b, and 6c that are substantially parallel to one another. Alternatively, a slider may have a step bearing floating surface including four or more kinds of parallel surfaces.

Figure 4:
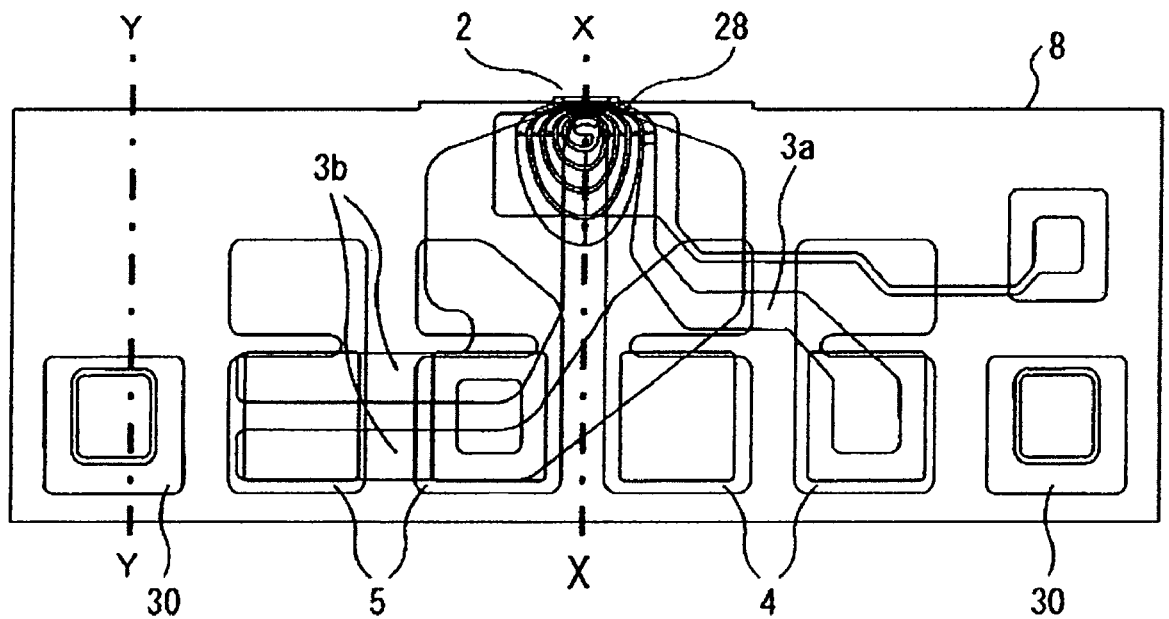
FIG. 4 is a side view of the magnetic head slider shown in FIG. 3 and seen from the side of an air outflow end surface.
Figure 5:
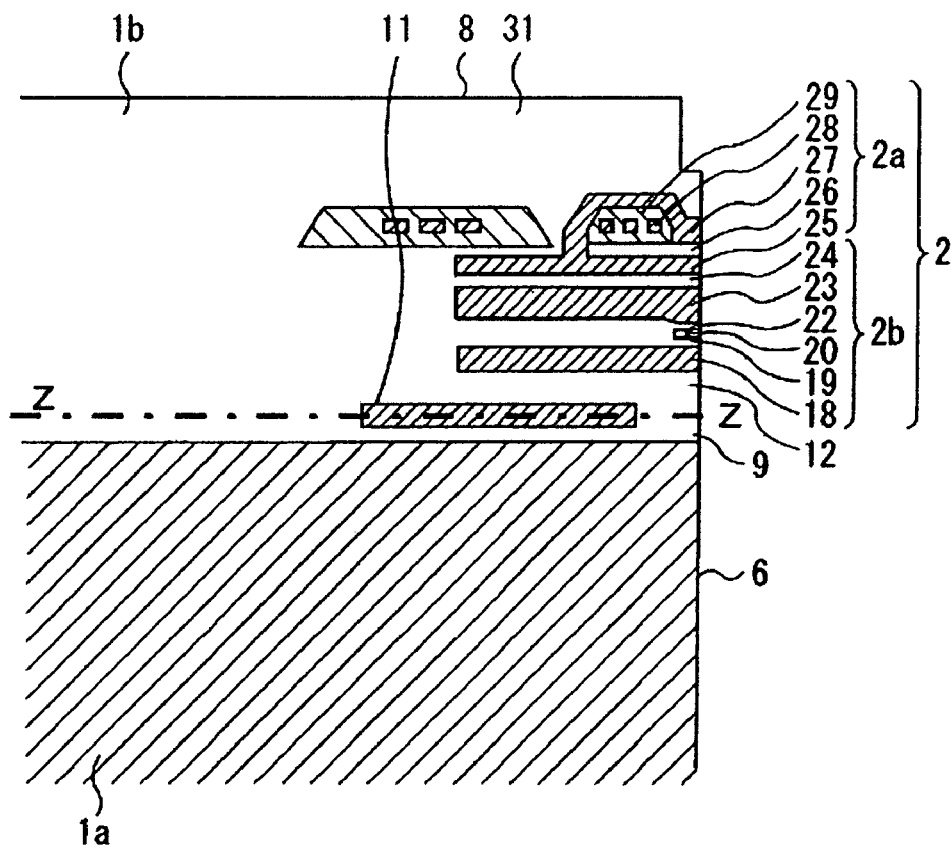
FIG. 5 is a sectional view along an X-X cutting-plane line shown in FIG. 4.
Figure 6:
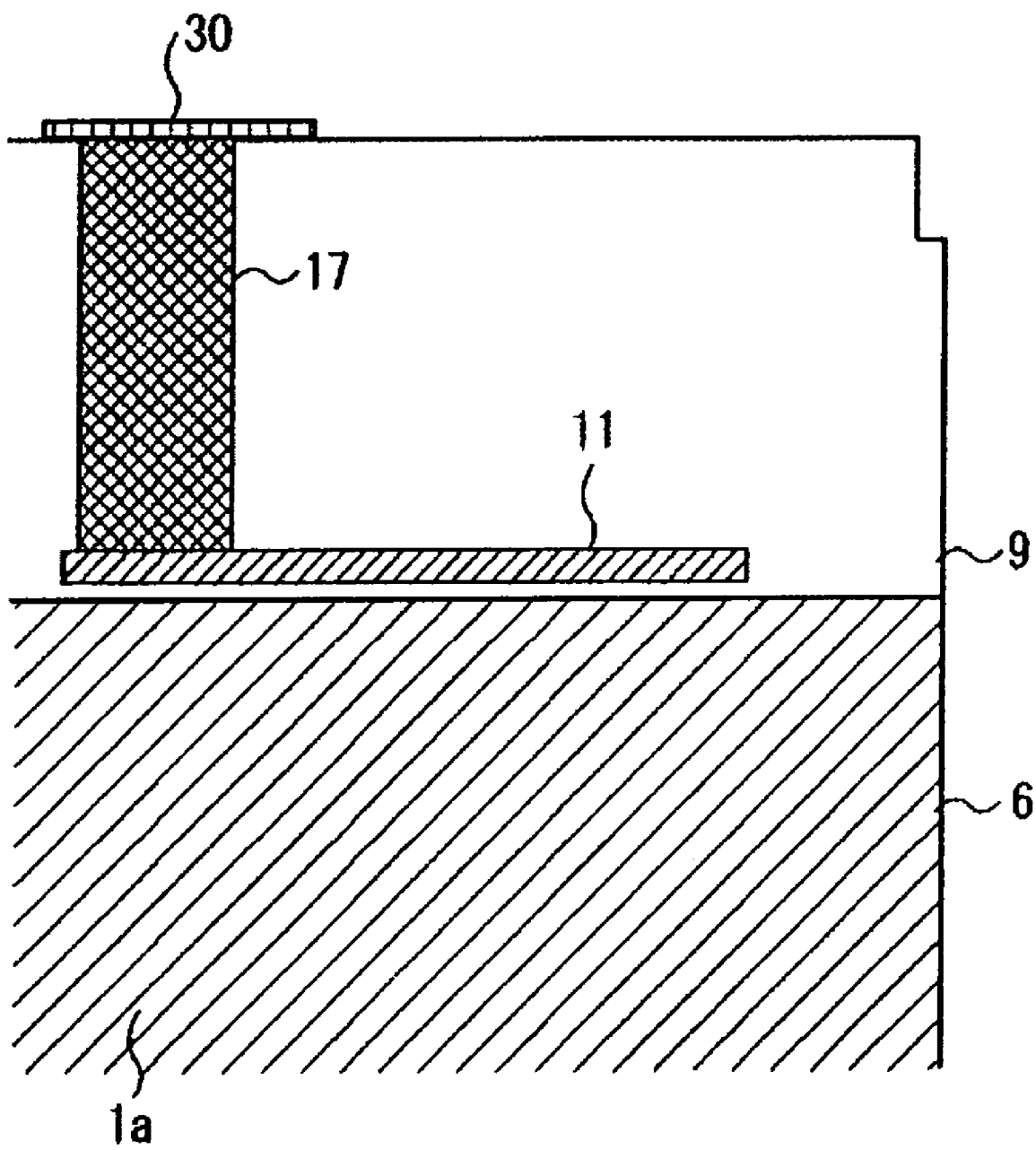
FIG. 6 is a sectional view along a Y-Y cutting-plane line shown in FIG. 4.

FIG. 4 is a side view of the magnetic head slider 1 shown in FIG. 3 and seen from the side of the air outflow end surface 8. FIG. 5 is a sectional enlarged view showing the thin-film magnetic head portion 1b, in which the magnetic recording/reproducing element 2 is formed, along an X-X cutting-plane line shown in FIG. 4. FIG. 6 is a sectional enlarged view showing a heating resistor relay terminal 30 along a Y-Y cutting-plane line shown in FIG. 5. Referring to FIG. 1A, FIG. 4, FIG. 5, and FIG. 6, the structure of the thin-film magnetic head portion 1b of the magnetic head slider 1 included in an embodiment of the present invention will be described below. As shown in FIG. 5, the magnetic recording/reproducing element 2 composed of a magnetic reproduction element 2b and a magnetic recording element 2a is formed in the thin-film magnetic head portion 1b on the substrate portion (slider) 1a by employing a thin-film manufacturing process. Moreover, a heater (heating resistor) 11 that heats part of the thin-film magnetic head portion 1b so that the thin-film magnetic head portion will jut out due to thermal expansion, and thus adjusts a magnitude of floating of the magnetic recording/reproducing element 2 is formed between the substrate portion 1a and magnetic reproduction element 2b. A rigid protective film 31 is formed to shield the heating resistor 11 and magnetic recording/reproducing element 2.

In order to increase a response speed, at which the magnetic head slider 1 initiates adjustment of a magnitude of floating, and reduce the adverse effect of heat dissipated from the heating resistor 11 on the magnetic reproduction element 2b, the heating resistor 11 should be interposed between the substrate portion (slider) 1a and the magnetic reproduction element 2b. The distal end of the heating resistor 11 should be located at a position at which the distal end recedes from the magnetic reproduction element 2b.

Referring to FIG. 4, the air outflow end surface 8 of the magnetic head slider 1 includes: recording relay terminals 4 via which two leader lines 3a (one of which is shown in FIG. 4) formed to conduct electricity to the magnetic recording element 2a in contact with the magnetic recording element 2a are electrically coupled to outside; reproduction relay terminals 5 via which leader lines 3b formed to conduct electricity to the electrodes of the magnetic reproduction element 2b in contact with the electrodes are electrically coupled to outside; and heating resistor relay terminals 30 via which studs 17 (see FIG. 6) formed to conduct electricity to the heating resistor 11 in contact with the heating resistor 11 are electrically coupled to outside. The rigid protective film 31 is formed over the magnetic recording/reproducing element 2 and leader lines 3a and 3b. Since the rigid protective film 31 is transparent, the magnetic recording/reproducing element 2 and leader lines 3a and 3b are shown to be seen on the air outflow end surface 8 in FIG. 4.

Figure 1:
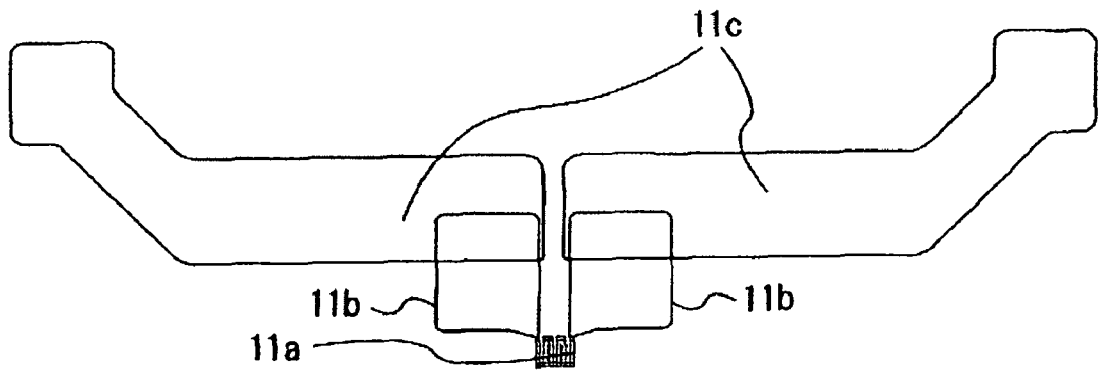
FIG. 1A is a plan view showing the structure of a heater incorporated in a magnetic head slider in accordance with an embodiment of the present invention.
FIG. 1B is a plan view showing the structure of a heater incorporated in a conventional magnetic head slider.
FIG. 1C is a plan view showing the overlaps between lead portions of the heater incorporated in the magnetic head slider and electrodes coupled to an MR element in accordance with an embodiment of the present invention.
Figure 1:
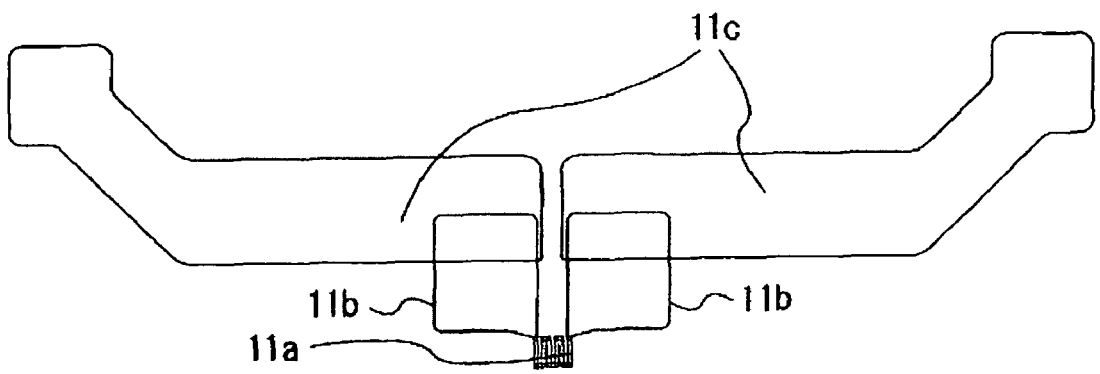
Figure 1:
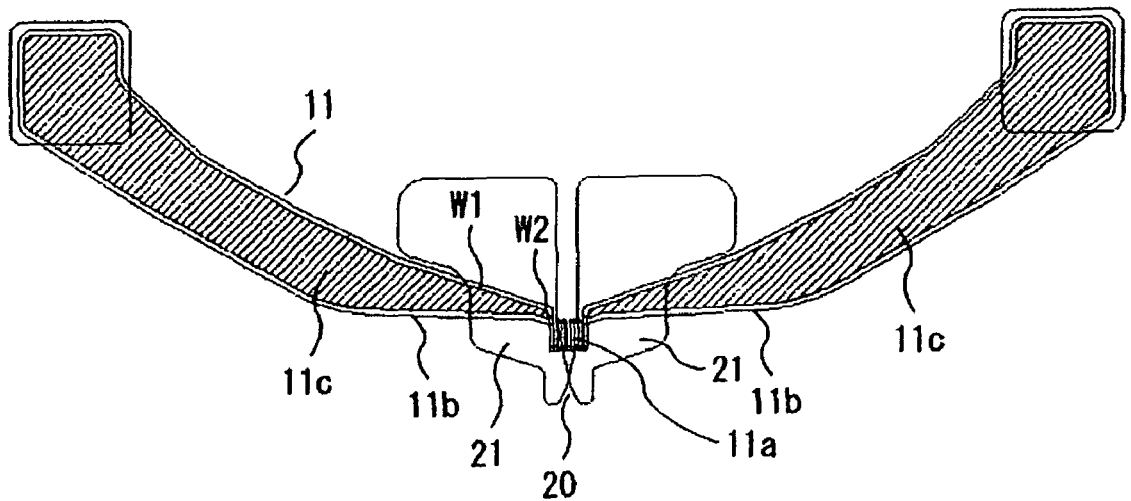

Next, a description will be made of the structures of the magnetic recording/reproducing element 2 and heater (heating resistor) 11, which are included in the magnetic head, by following manufacturing steps. As shown in FIG. 5, a base insulating film 9 made of alumina or the like is formed over the substrate portion (slider) 1a, and the heating resistor 11 realized with a thin-film resistor formed with a metallic film is formed on the base insulating film 9. FIG. 1A shows the structure of the heating resistor 11 seen on the side of the air outflow end surface 8. The heating resistor 11 includes a heating portion 11a formed by tortuously arranging the thin-film resistor of a metallic film, terminal portions 11b extending from the heating portion 11a, and lead portions 11c layered on the respective terminal portions 11b. The heating resistor 11 will be described later.

Thereafter, as shown in FIG. 5, an insulating layer 12 made of alumina or the like is formed over the heating resistor 11, and a lower shield film 18 is formed on the insulating layer 12. The top of the lower shield film 18 is evened through chemical mechanical polishing (CMP). A lower gap film 19 made of alumina or the like is formed on the evened lower shield film 18. A magnetoresistive effect element (hereinafter called an MR element) 20 serving as a magnetic sensor and a pair of electrodes 21 (see FIG. 11) is used to lead out a magnetic signal produced by the MR element 20 as an electric signal are then formed. Thereafter, an upper gap film 22 made of alumina or the like and an upper shield film 23 are formed, and the top of the upper shield film 23 is evened through CMP. An upper shield insulating film 23 made of alumina or the like is formed on the evened upper shield film 23. Thus, the formation of the heating resistor 11 and magnetic reproduction element 2b is completed.

Thereafter, the structure of the magnetic recording element 2a will be described below. A lower magnetic pole 25 is formed on the upper shield insulating film 24, and a magnetic gap film 26 made of alumina or the like is formed over the lower magnetic pole 25. A coil 28 through which a current flows so as to generate a magnetic field and an organic insulating film 29 enclosing the coil 18 are formed on the magnetic gap film 26. Thereafter, an upper magnetic pole 27 magnetically coupled to the lower magnetic pole via a back gap is formed. Thereafter, a rigid protective film 31 made of alumina or the like and intended to protect or isolate the foregoing group of element pieces is formed so that it will cover the formed element entirely. Thereafter, as shown in FIG. 4, the recording relay terminals 4 via which a current is externally fed to the coil 28 and the reproduction relay terminals 5 via which a magnetic signal is transmitted to outside are formed on the rigid protective film 31. Concurrently, the heating resistor relay terminals 30, via which a current is externally fed to the heating resistor 11, is formed.

The heating resistor relay terminals are, as shown in FIG. 6, formed on the studs 17. The studs 17 are formed by plating the ends of the lead portions 11c with copper. Openings in which the studs 17 are formed are created during the formation of the insulating films. The recording relay terminals 4 and reproduction relay terminals 5 are formed on studs created on the ends of the leader lines 3a and 3b respectively.

Next, a method of forming the heating resistor 11 shown in FIG. 1A will be described below. The heating resistor 11 is formed using a thin-film manufacturing process. A metallic material such as NiCr or NiFe is optimal as a material to be made into the heating portion 11a and terminal portions 11b. The thicknesses of the heating portion 11a and terminal portions 11b preferably range from approximately 100 nm to approximately 200 nm. Incidentally, the material of the heating portion 1a may be different from the material of the terminal portions 11b. A metallic material whose specific resistance is smaller than that of the heating portion 11a, such as, Cu or Au is optimal as the material of the lead portions 11c. The thickness of the lead portions 11c preferably ranges from approximately 150 nm to approximately 250 nm. In the present embodiment, the material made into the heating portion 11a and terminal portions 11b is NiCr, and the thickness thereof is approximately 150 nm. The heating portion 11a is formed by tortuously laying a thin line, which has a width of approximately 4.5 μm, within an area having a depth of approximately 60 μm and a width of approximately 60 μm. Herein, the spacing between adjoining parts of the tortuous thin line is filled with alumina. A resistance offered by the heating portion 11a and terminal portions 11b preferably ranges from approximately 300 to approximately 600Ω. In the present embodiment, the resistance is set to approximately 500Ω. The material of the lead portions 11c is Cu, and the thickness thereof is approximately 200 nm. The resistance offered by the lead portions 11c preferably ranges from approximately 3Ω to approximately 60Ω. In the present embodiment, the resistance is set to approximately 5Ω.

For control of a magnitude of floating by utilizing heat dissipated from the heating resistor 11, it is necessary to highly precisely control the resistances offered by the heating portion 11a, terminal portions 11b, and lead portions 11c respectively. For minimization of a heat loss occurring in the lead portions 11c, it is quite important to make the resistance offered by the lead portions 11c lower than the resistances offered by the heating portion 11a and terminal portions 11b respectively. Specifically, the resistance offered by the lead portions 11 is one-fifths or less of the resistances offered by the heating portion 11a and terminal portions 11b respectively, or more preferably, one-fiftieths or less thereof. Since the heating portion 11a and terminal portions 11b are produced at a step different from a step of producing the lead portions 11c, if a contact resistance increases at the overlaps between the terminal portions 11b and the lead portions 11c, the resistance offered by the lead portions 11c increases to raise the heat loss. Consequently, a predetermined amount of heat is not dissipated from the heating portion 11a. This makes it impossible to achieve expected minimization of a magnitude of floating and leads to a failure in filling the role of a thin-film magnetic head. FIG. 1B is a plan view showing the overlaps between the terminal portions 11b and lead portions 11c of a conventional heater. The overlap ratio is approximately 10% of the area of each of the lead portions 11c. In the present embodiment, the overlap ratio between the terminal portions 11b and lead portions 11c of the heating resistor 11 is, as shown in FIG. 1A, approximately 90% of the area of each of the terminal portions 11b (100% of the area of each of the lead portions 11c). In the present embodiment, the heating portion 11a and terminal portions 11b are first formed, and the lead portions 11c are then formed on the terminal portions 11b. Alternatively, the lead portions 11c may be formed first, and the heating portion 11a and terminal portions 11b may be formed thereafter so that the terminal portions 11b will overlap the lead portions 11c.

Figure 7:
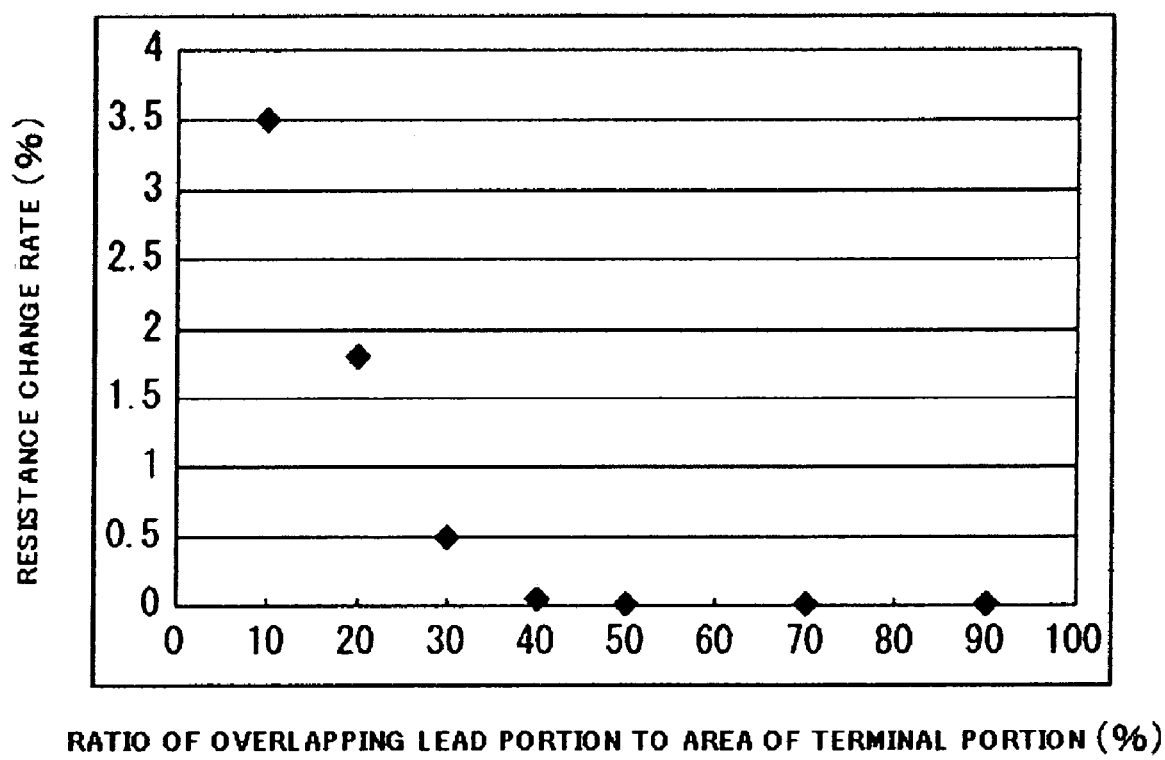
FIG. 7 is a graph showing the results of examination on the relationship between the ratio of the area of an overlapping lead portion of the heater to the area of a terminal portion thereof and the resistance of a heating resistor.

It should be noted that the area of overlap of a lead pattern between each terminal portion 11b and each lead portion 11c is directed to minimize the contact resistance between the terminal portion 11b and lead portion 11c. FIG. 7 graphically shows the results of examination on the relationship between the parameter and the resistance of the heating resistor 11. The axis of abscissas reads the values of the ratio of the overlapping lead portion 11c to the area of the terminal portion 11b, and the axis of ordinates reads the values of a change rate at which the resistance of the heating resistor 11 changes.

The results of examination shown in FIG. 7 demonstrate that when the area of a lead pattern, that is, the overlap between each terminal portion 11b and each lead portion 11c occupies approximately 50% or more of the area of the terminal portion 11c, a change (increase) in the resistance of the heating resistor 11 stemming from a change (increase) in the contact resistance occurring at the overlap, that is, a change (increase) in the resistance of the lead portion 11c can be prevented.

As mentioned above, according to the present embodiment, an increase in a resistance offered by the lead portions of a heating resistor can be prevented. Consequently, a heat loss occurring in the lead portions can be minimized. Eventually, a predetermined amount of heat can be dissipated from a heating portion. Consequently, an expected effect can be exerted in minimization of a magnitude of floating of a slider.

Figure 8:
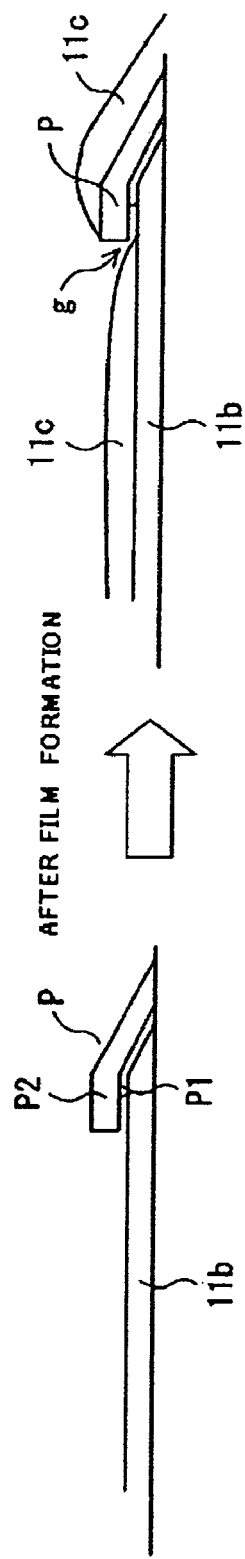
FIG. 8A shows a method of forming the terminal portions and lead portions of the heater incorporated in the magnetic head slider in accordance with an embodiment of the present invention.
FIG. 8B shows a case where the shape of each lead portion is abnormal.
Figure 8:
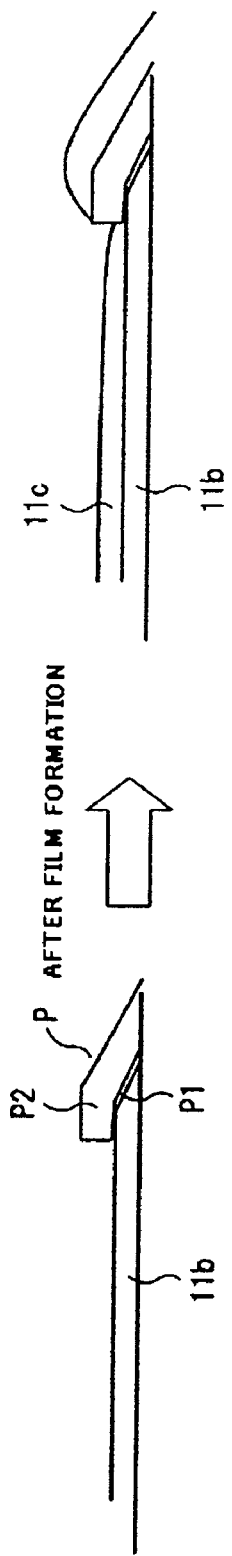
Figure 9:
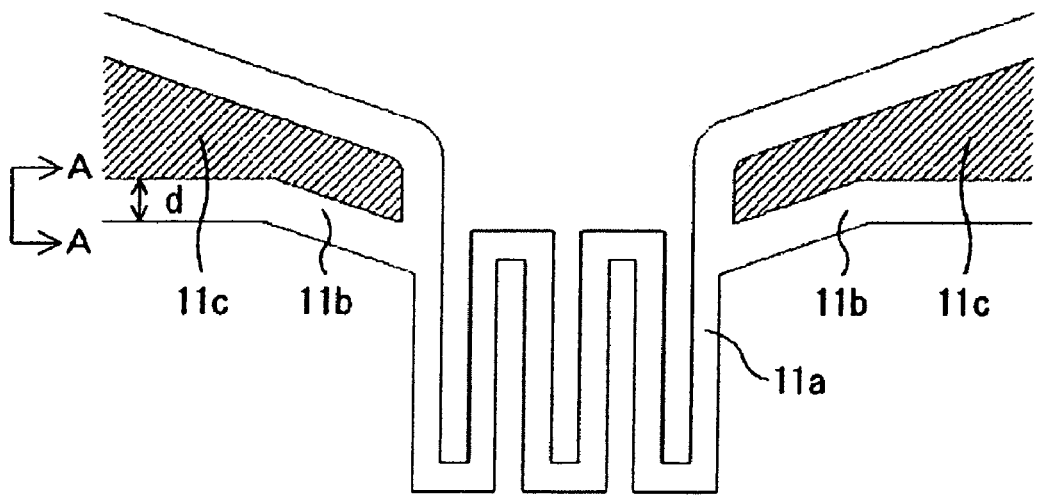
FIG. 9 is a plan view showing the overlaps between the terminal portions and lead portions of the heater near the heating portion of the heater.

As described in relation to the present embodiment, the heating portion 11a and terminal portions 11b of the heating resistor 11 are formed at a step different from a step of forming the lead portions 11c. It is important to accurately form a pattern of each lead portion 11c on each terminal portion 11b. If the pattern of each lead portion 11c is inaccurate, the resistance of the lead portion 11c is adversely affected. In many cases, the resistance increases. Referring to FIG. 8A and FIG. 8B, a lead pattern to be adapted to the heating resistor 11 will be described below. FIG. 9 is a plan view of the overlaps between the terminal portions 11b and lead portions 11c showing how the terminal portions 11b and lead portions 11c overlap near the heating portion 11a. FIG. 8A and FIG. 8B show a liftoff step seen in the direction of an A-A cutting-plane line shown in FIG. 9. FIG. 8A is concerned with a case where the pattern of the lead portion 11c overlapping the terminal portion 11b is normal, while FIG. 8B is concerned with a case where the pattern is abnormal.

Referring to FIG. 8A, a first resist pattern P1 to be lifted off is formed at both ends of each terminal portion 11b, a second resist pattern P2 larger than the first resist pattern P1 is formed on the first resist pattern P1, and a mushroom-shaped liftoff resist pattern P is thus completed. Thereafter, a metallic film serving as the lead portions 11c is formed on the conductive portions 11b and the liftoff resist patterns P through sputtering. Thereafter, the liftoff resist patterns P and overlying metallic film 11c are removed using a release agent. Since the liftoff resist patterns P are shaped like a mushroom, a gap g is created between an end of each lead portion 11c and each liftoff resist pattern P. The release agent enters through the gap g, whereby the liftoff resist pattern P and overlying metallic film 11c are removed. At this time, the end of each lead portion 11c does not break but the pattern remains normal.

FIG. 8B is concerned with a case where the terminal of an undercut of each first resist pattern P1 is located close to the edge of each terminal portion 11b. In this case, when each second resist pattern P2 has been formed, each liftoff resist pattern P is not shaped like a mushroom because the lower resist flows away. As long as the liftoff resist pattern P has such a shape, the gap g is not created between the end of the lead portion 11c and the liftoff resist pattern P. This disables liftoff. An abnormal pattern having the end of the lead portion 11c broken ensues.

Figure 10:
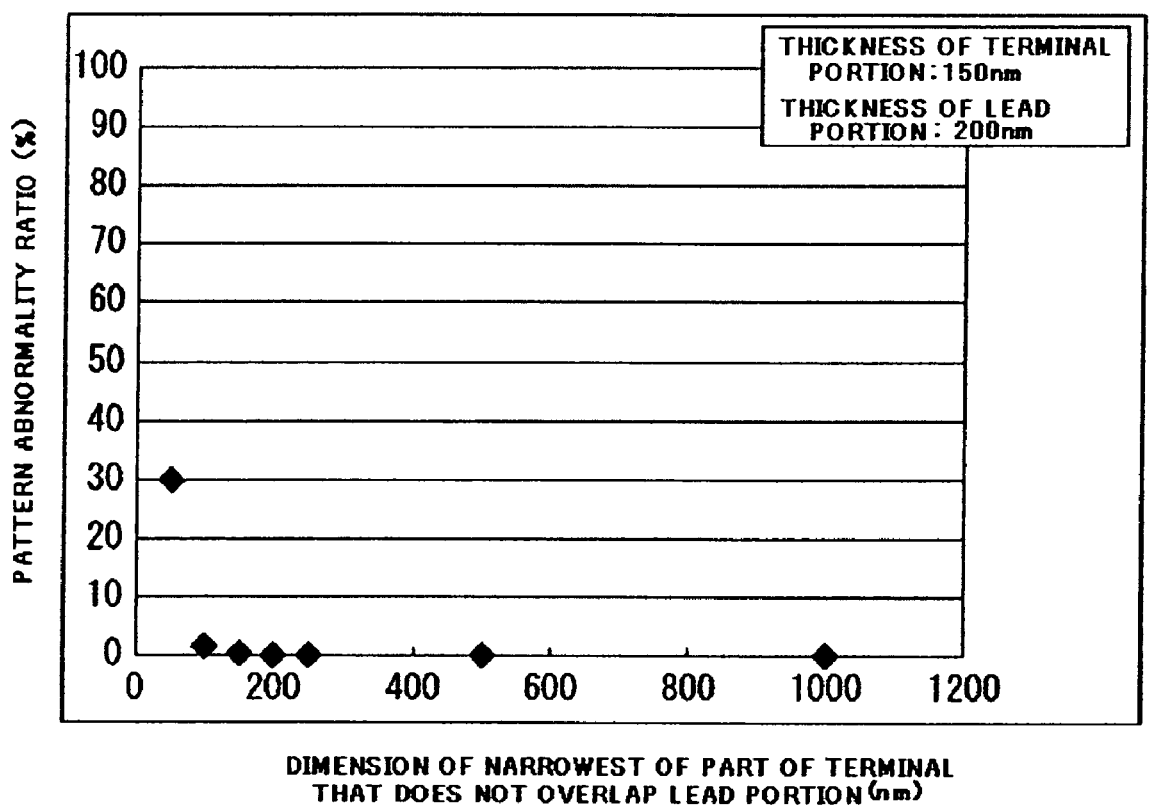
FIG. 10 is a graph showing the results of examination on the relationship between the smallest dimension of part of each terminal portion of the heater that does not overlap each lead portion and the thicknesses of the terminal portion and lead portion respectively and the relationship between the smallest dimension and a pattern abnormality ratio.

It should be noted that the relationship between the dimension of part of each terminal portion 11b, which does not overlap each lead portion 11c, from the edge of the terminal portion 11b (preferably, the dimension of the narrowest part) and the thicknesses of the terminal portion 11b and lead portion 11c respectively is directed to forming the lead portion 11c on the terminal portion 11b so that the lead portion 11c will have a normal pattern. FIG. 9 shows the dimension d of the part of the terminal portion 11b, which does not overlap the lead portion 11c, from the edge of the terminal portion 11b. FIG. 10 graphically shows the results of examination on the relationship between the parameter d and a pattern formability ratio. In FIG. 10, the axis of abscissas reads the values of the dimension d of the narrowest of the part of the terminal portion 11b which does not overlap the lead portion 11c, and the axis of ordinates reads the values of a pattern abnormality ratio. The results shown in FIG. 10 demonstrate that when the smallest dimension d of the part of the terminal portion 11b which does not overlap the lead portion 11c is larger than the thickness of the terminal portion 11b of approximately 150 nm and the thickness of the lead portion 11c of approximately 200 nm, the pattern formability ratio of the lead portion 11c becomes nearly 100%. The above description applies to a case where the lead portion 11c is formed on the terminal portion 11b. The same applies to a case where the terminal portion 11b is formed on the lead portion 11c.

As mentioned above, when terminal portions of a thin-film resistor and patterns of lead portions thereof are formed accurately, an increase in a resistance offered by the lead portions of the heating resistor described in relation to the embodiment can be prevented reliably.

As shown in FIG. 1C, the pair of electrodes 21 coupled to the MR element 20 is formed over the laminates of the terminal portions 1b and lead portions 11c of the thin-film resistor 11. Since a dielectric made of alumina or the like is interposed between each of the lead portions 11c and each of the electrodes 21, an electrostatic capacitance is produced. The electrostatic capacitance presumably increases due to the adverse effect of heat dissipated from the heating portion 11a and lead portions 11c of the thin-film resistor 11. If electrostatic charge increases due to the increase in the electrostatic capacitance, the MR element may be damaged because of discharge. The shape of the pattern of each lead portion 11c may be directed to suppressing the increase in the electrostatic capacitance. Consequently, when the pattern of the lead portion 11c is tapered toward the heating portion 11c, if the width W1 of the widest part of the pattern of the lead portion 11c overlapping each electrode 21 coupled to the MR element is twenty times or less larger than the width W2 of the part of the pattern near the heating portion, the increase in the electrostatic capacitance between the lead portion 11c and the electrode 21 coupled to the MR element, which is derived from the adverse effect of heat dissipated from the heating portion 11a and lead portion 11c of the thin-film resistor 11, can be prevented.

Moreover, the width of part of each electrode 21 overlapping each lead portion 11c is made smaller and the width of part thereof that does not overlap the lead portion 11c is made larger toward the depth direction. Namely, the width of the widest part of each electrode 21 overlapping each lead portion 11c is made smaller than the width of the narrowest part of the electrode 21 that does not overlap the lead portion 11c behind the lead portion 11c. Thus, the increase in the electrostatic capacitance between each lead portion 11c and each electrode 21 due to the adverse effect of heat dissipated from the heating portion 11a and lead portion 11c can be suppressed without an increase in the resistance of the electrode 21.

While the present invention has been described with reference to specific embodiments, those skilled in the art will appreciate that different embodiments may also be used. Thus, although the present invention has been described with respect to specific embodiments, it will be appreciated that the present invention is intended to cover all modifications and equivalents within the scope of the following claims.

What is claimed is:

1. A magnetic head slider comprising:
a slider;
a magnetic head formed in an air outflow end surface of the slider; and
a heater located near the magnetic head and comprising a heating portion, terminal portions extending from both ends of the heating portion, and lead portions overlapping the respective terminal portions at an overlap ratio of approximately 50% or more.

2. The magnetic head slider according to claim 1, wherein a resistance offered by the lead portions is one-fifth or less of resistances offered by the heating portion and terminal portions respectively.

3. The magnetic head slider according to claim 1, wherein resistances offered by the heating portion and terminal portions respectively range from approximately 300 Ω to approximately 600 Ω, and a resistance offered by the lead portions ranges from approximately 3 Ω to approximately 60Ω.

4. The magnetic head slider according to claim 1, wherein the thickness of the terminal portions ranges from approximately 100 nm to approximately 200 nm, and the thickness of the lead portions ranges from approximately 150 nm to approximately 250 nm.

5. The magnetic head slider according to claim 1, wherein the heating portion and terminal portions are made of NiCr or NiFe, and the lead portions are made of Cu or Au.

6. The magnetic head slider according to claim 1, wherein the lead portions overlie the respective terminal portions.

7. The magnetic head slider according to claim 6, wherein the dimension from the edge of each terminal portion in a lateral direction thereof to the edge of each lead portion is equal to or larger than 200 nm.

8. The magnetic head slider according to claim 1, wherein the lead portions underlie the respective terminal portions.

9. The magnetic head slider according to claim 1, wherein: the magnetic head includes a reproduction element and electrodes coupled to both ends of the reproduction element; the heater underlies or overlies the magnetic head; the lead portions of the heater are tapered toward the heating portion thereof; and the width of the widest of part of each electrode of the magnetic head, which overlaps each lead portion, is smaller than the smallest width of part of the electrode of the magnetic head that does not overlap the lead portion behind the lead portion.

10. The magnetic head slider according to claim 1, wherein: the magnetic head includes a reproduction element and electrodes coupled to both ends of the reproduction element; the heater underlies or overlies the magnetic head; the lead portions of the heater are tapered toward the heating portion thereof; and the width of the widest of part of each lead portion, which overlaps each electrode of the magnetic head, in a lateral direction of the lead portion is twenty times or less larger than the width of the narrowest part of the lead portion.

11. A magnetic head slider comprising:
a slider:
a magnetic head formed in an air outflow end surface of the slider; and
a heater located near the magnetic head and comprising a heating portion, terminal portions extending from both ends of the heating portion, and lead portions overlapping the respective terminal portions at an overlap ratio of approximately 50% or more; wherein the lead portions overlie the respective terminal portions and wherein the dimension from the edge of each terminal portion in a lateral direction thereof to the edge of each lead portion is larger than the thickness of the terminal portion and lead portion respectively.

12. A magnetic head slider comprising:

a slider;

a magnetic head formed in an air outflow end surface of the slider; and a heater located near the magnetic head and comprising a heating portion, terminal portions extending from both ends of the heating portion, and lead portions overlapping the respective terminal portions at an overlap ratio of approximately 50% or more; wherein the lead portions underlie the respective terminal portions wherein the dimension from the edge of each lead portion in a lateral direction thereof to the edge of each terminal portion is larger than the thickness of the lead portion and terminal portion respectively.

13. The magnetic head slider according to claim 8, wherein the dimension from the edge of each lead portion in a lateral direction thereof to the edge of each terminal portion is equal to or larger than 200 nm.

* * * * *